UNITED STATES PATENT OFFICE.

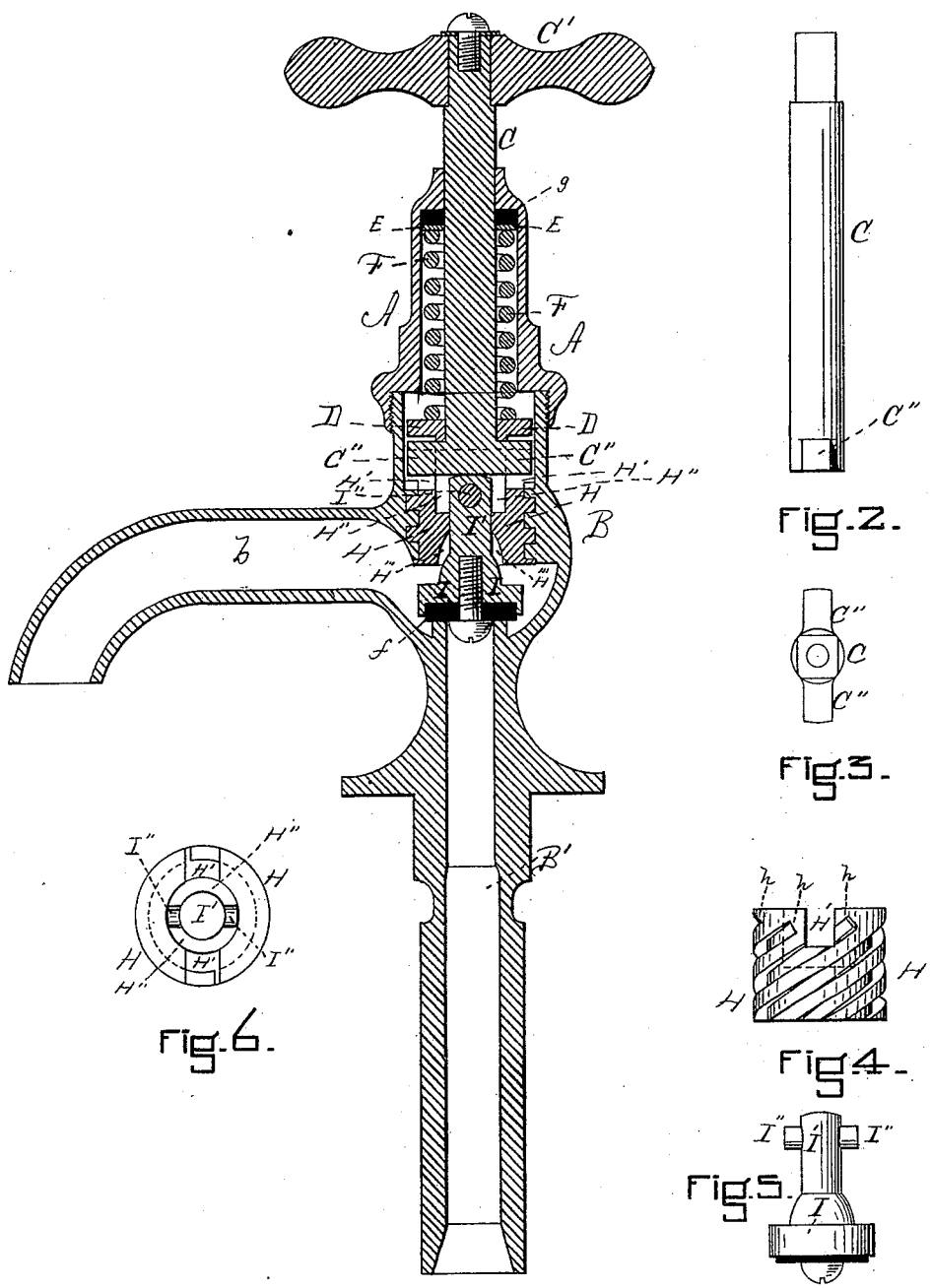

HENRY B. LEACH, OF BOSTON, MASSACHUSETTS.

FAUCET.

SPECIFICATION forming part of Letters Patent No. 269,687, dated December 26, 1882.

Application filed October 12, 1882. (No model.)

*To all whom it may concern:*

Be it known that I, HENRY B. LEACH, of Boston, in the county of Suffolk and State of Massachusetts, have invented new and useful Improvements in Faucets, of which the following is a specification.

In the accompanying drawings, in which similar letters of reference indicate like parts, Figure 1 is a vertical section of a faucet embodying my invention. Fig. 2 is a side elevation of the operating-spindle with the handle removed. Fig. 3 is a top view or plan of the same. Fig. 4 is an elevation of the recessed screw, below described. Fig. 5 is an elevation of the valve, also below described. Fig. 6 is a plan view of the said screw with the valve in position, showing the valve-stem and lifting-pin.

A and B represent the casing or body, the former being screwed upon the latter, and the latter being provided with the inlet or supply pipe B' and the outlet or nozzle b.

C is the operating-spindle, having the ordinary handle, C', and provided with arms C'' at its lower end. Lying upon the arms C'' and surrounding the spindle C is the ring-plate D, and between this plate and the ring-plate E is the spring F. The function of this ring-plate or swivel-plate D is by remaining stationary when the spindle C is being turned by means of the handle to prevent the spring from being turned or twisted; or if the plate D should turn slightly the spring turning with it would also turn the plate E, thus preventing any twisting or relative rotation of the spring. The arms C'' of the spindle lie in the slot H' of the quick-threaded screw H, placed in a thread in the casing B. This screw is provided with a recess, H'', and the stem I', provided with the lifting-pin I'' of the valve I, extends into this recess through a central vertical passage, H''', as shown. Broken lines in Fig. 4 show the shape of the recess. When the spindle C is turned by means of the handle C' the arms C'', lying in the slot H', turn and consequently lift the screw or screw-nut H, and the lifting-pin I'', being raised by the bottom of the recess H'', lifts the valve I from its seat and lets on the water. Upon releasing the spindle the spring forces the parts into their former position, shutting off the water. There being no packing excepting at the points *f* and *g*, the parts are kept lubricated by the water itself, which floods the interior of the casing A B every time the water is let on.

It is essential that the lower end of the spindle C should rest on the top of the valve-stem I', (see Fig. 1,) so that the valve will be held on its seat by the pressure of the spring F.

Stops *h* are formed in the screw H (see Fig. 4) by the screw-grooves ending before they reach the upper end of said screw, and thus the screw is prevented from being screwed down too far and jamming the valve upon its seat, causing the parts to stick in the casing.

I am aware that valves pulled and pushed from their seats by quick-threaded screws and inclines are not novel; hence I make no claim to them in themselves considered.

Having thus fully described my invention, what I claim, and desire to secure by Letters Patent, is—

1. In a faucet, the combination of the spindle C, provided with one or more arms, C'', the screw-nut H, provided with the slot H' and recess H'', and the valve I, provided with the valve-stem I' and lifting-pin I'', all arranged and constructed substantially as and for the purpose described.

2. In a faucet, the combination of the valve I, provided with the valve-stem I' and lifting-pin I'', and the screw-nut H, provided with the recess H'', and adapted to be turned by means of the spindle C, substantially as and for the purpose set forth.

3. In a faucet, the combination of the screw-nut H, provided with the perforation or passage H''', and valve-stem I', swiveled in said screw-nut, substantially as and for the purpose specified.

4. In a faucet, the combination, with the spindle C, provided with an enlarged base or lower end, of the swivel-plate D and spring F, substantially as and for the purpose described.

5. The combination, with the spindle C C'' and valve I I' I'', of the screw-nut H, provided with the stops *h h*, substantially as and for the purpose set forth.

6. The combination, with the spindle C, spring F, and swivel-plate D, of the plate E, substantially as and for the purpose described.

HENRY B. LEACH.

Witnesses:
HENRY W. WILLIAMS,
IRVING H. BAKER.